(12) United States Patent
Amatsutsu

(10) Patent No.: US 6,340,181 B1
(45) Date of Patent: Jan. 22, 2002

(54) BELLMOUTH WITH JOINT BLOCK BODY WITH THE BELLMOUTH AND HAND HOLE WITH THE BELLMOUTH

(75) Inventor: Hiroyuki Amatsutsu, Osaka (JP)

(73) Assignee: Totaku Industries, Inc., Osaka (JP)

( * ) Notice: Subject to any disclaimer, the term of this patent is extended or adjusted under 35 U.S.C. 154(b) by 0 days.

(21) Appl. No.: 09/438,841

(22) Filed: Nov. 12, 1999

(30) Foreign Application Priority Data

Nov. 12, 1998 (JP) .......................................... 10-322464

(51) Int. Cl.<sup>7</sup> ................................................ F16L 5/00
(52) U.S. Cl. ........................ 285/321; 285/903; 52/20; 52/220.8
(58) Field of Search ................................ 285/321, 903; 52/20, 21, 220.8, 169.6

(56) References Cited

U.S. PATENT DOCUMENTS

| 810,855 | A | * | 1/1906 | Haller et al. | 52/20 |
| 2,260,712 | A | * | 10/1941 | Harrison | 285/903 |
| 3,193,309 | A | * | 7/1965 | Morris | 285/903 |
| 3,731,448 | A | * | 5/1973 | Leo | 52/20 X |
| 3,948,548 | A | * | 4/1976 | Voss | 285/321 |
| 4,805,920 | A | * | 2/1989 | Gavin | 52/21 X |
| 5,258,572 | A | * | 11/1993 | Ozeki et al. | 52/20 X |
| 5,345,728 | A | * | 9/1994 | Sugda | 52/21 |
| 5,584,317 | A | * | 12/1996 | McIntosh | 52/20 X |
| 5,655,564 | A | * | 8/1997 | Gavin | 52/21 X |
| 5,845,944 | A | * | 12/1998 | Enger et al. | 285/321 X |
| 5,941,535 | A | * | 8/1999 | Richard | 52/220.8 X |

FOREIGN PATENT DOCUMENTS

| JP | 53144146 | * | 12/1978 | 52/20 |
| JP | 6173285 | * | 6/1994 | 52/21 |
| JP | 9182267 | * | 7/1997 | 52/21 |
| JP | 9221768 | * | 8/1997 | 52/21 |

* cited by examiner

Primary Examiner—Lynne H. Browne
Assistant Examiner—David E. Bochna
(74) Attorney, Agent, or Firm—McGinn & Gibb, PLLC

(57) ABSTRACT

A bellmouth with a joint including a cylindrical-shaped portion having a first opening disposed at its one end so as to spread in a trumpet-like shape, a second opening disposed at the other end of the cylindrical-shaped portion, an inclined cylinder which is formed adjacent to the second opening which is larger in diameter on a deep side than on an end face thereof, a securing stepped portion formed on a rear surface of the inclined cylinder, and a plurality of projecting portions respectively provided at a rear portion of the inclined cylinder.

18 Claims, 15 Drawing Sheets

BELLMOUTH WITH JOINT BLOCK BODY WITH THE BELLMOUTH AND HAND HOLE WITH THE BELLMOUTH

BACKGROUND OF THE INVENTION

1. Field of the Invention

The present invention relates to a bellmouth which, mainly when a cable protection pipe passage for an electric wire, a telephone wire, an optical cable and the like is buried into the ground, is mounted on the side wall of a hand hole and a manhole to be installed as a cable relay station and allows a pipe for forming a pipe passage to be connected thereto. The present invention also relates to a concrete body using the bellmouth. The present invention further relates to a handhole or manhole using the bellmouth.

2. Description of the Related Prior Art

Conventionally, when a cable pipe passage is laid down in the ground, as a cable relay station, there are set up hand holes and manholes at every proper intervals in the cable pipe passage.

Note that in the specification and claims, both of the hand hole and the man hole are represented by simply hand holes, because these holes are similar in configuration and shape which are easily understandable by a person skilled in the art.

In setting up such hand hole, as known well, there are employed two types of setting-up-processes. The one of the setting-up-processes is that the ground is dug by a required depth to form a hole, and concrete is placed into the hole to thereby produce the peripheral wall body of the hand hole on site. The other of the seeting-up-processes is that a hand hole previously formed in a factory or the like is carried to the installation site and buried there.

Also, in either case, generally, at the same time when the peripheral wall of the hand hole is formed, there is formed in the side wall of the hand hole a through bore which communicates with the inside and outside of the hand hole and is necessary to mount a bellmouth to which a pipe for forming a cable pipe passage can be connected. However, in the former case, that is, in the member for forming the hand hole on site, it is also known to mount the bellmouth on the peripheral wall at the same time when the hand hole is formed.

Thus, in either case, the bellmouth to be mounted on the hand hole is formed as a substantially simple, cylindrical-shaped member including on one end side thereof a trumpet-shaped portion which is to be disposed inside the hand hole.

Therefore, to connect the pipe passage forming pipe to such cylindrical-shaped bellmouth, the end of the pipe is inserted into or fitted over the projecting portion of the bellmouth which projects externally from the hand hole, and a hardening agent solution for stopping the water is poured into between them or water stopping tape is wound around them.

However, the above operations respectively take time and labor and, especially, there are not found many cases in which only one bellmouth is mounted on a hand hole; but, in many cases, three mutually adjoining bellmouth, which are arranged in the horizontal direction, are mounted in two upper and lower stages, adding up to six bellmouths (that is, 3×2=6), or, three mutually adjoining and horizontally arranged bellmouths are mounted in three vertical stages, adding up to nine bellmouths (that is, 3×3=9). In these cases, it is difficult to connect all pipes to the bellmouths in a perfectly watertight condition and such connecting operation requires a lot of time and labor. Also, even if an operation to connect the pipes to the bellmouths is completed, unless hardening agents used for mounting cement mortar harden perfectly, it is not possible to insert electric wires or the like into the pipes.

Especially, in the conventional member for connecting a pipe to a bellmouth, it is difficult to connect the pipe to the bellmouth in such a manner that, after a pipe passage is formed, when an external pressure such as the earth pressure or the like acts on the pipe to thereby apply a tensile force to the pipe in the axial direction of the pipe, such connection can overcome this tensile force to thereby allow the connected portion between the bellmouth and pipe to be free from the damage, that is, the watertight connected condition between them can be prevented against destruction. In other words, according to the conventional pipe and bellmouth connecting member, it is difficult to give the pipe and bellmouth connected portion sufficient resistance to the external force which is applied thereto in the connection removing direction thereof. Also, when there arises a need to detach the pipe from the bellmouth for one reason or another, it is difficult to detach the pipe from the bellmouth; and, as in a case in which a pipe is connected to a bellmouth using a hardening agent solution, it is difficult to detach the pipe in such a manner that the detached pipe can be connected again to the bellmouth without damaging the bellmouth and pipe.

SUMMARY OF THE INVENTION

It is an object of the present invention to eliminate the above-mentioned drawbacks found in the conventional connecting member for connecting a pipe to a bellmouth mounted on a hand hole or the like.

Note that the reference numerals given in the drawings corresponding to the embodiments of present invention are added in the explanation below only for the purpose of making an understanding easier.

Accordingly, it is a first object of the invention to provide a bellmouth structured such that the bellmouth itself includes a joint portion formed integrally with an opening thereof to be disposed outside a hand hole, while a pipe to be connected to the bellmouth includes in its connecting end a joint portion corresponding to the joint portion of the bellmouth, and connection of the pipe to the bellmouth can be completed by a very simple one-touch operation, that is, simply by inserting the pipe in the axial direction of the pipe into the bellmouth.

Also, it is a second object of the invention to provide a bellmouth to which a pipe can be connected in a watertight condition by such one-touch operation.

Further, it is a third object of the invention to provide a bellmouth which, it the need arises, allows the connected condition between the pipe and bellmouth to be removed by a very simple operation in such a manner that the thus detached pipe can be connected again to the bellmouth with no fear of being damaged.

The above object can be achieved by a bellmouth with joint, according to a first aspect of the present invention, comprises:

a bellmouth main body X and an engaging ring R produced separately from the bellmouth main body M; the bellmouth main body M including a cylindrical-shaped portion 15 having one opening 16 formed so as to spread in a trumpet-like shape, the other opening of the cylindrical-shaped portion 15 including a guide cylinder 11 capable of connecting a pipe thereto, a large-diameter cylinder portion 12 so formed in the deeper portion of the other opening as to be continuous with the guide cylinder 11 and having a larger diameter than front and rear walls respectively formed before and behind the large-diameter cylinder portion 12 in the axial direction of the pipe, and an outwardly facing projection 14 provided on a portion of the large-diameter cylinder portion 12; the engaging ring R including a guiding inclined surface 31 formed so as to have a C-like non-annular shape when viewed from the side surface thereof, the guiding inclined surface 31 being formed such that the inside diameter of one end face 31a side thereof is large but the inside diameter of the deep side thereof is small, the engaging ring R further including a securing stepped portion 32 formed on the deep side thereof, a plurality of notches 33 respectively formed by cutting out the inclined surface 31, and a projection 34 provided on and projected from a portion of the outer peripheral surface of the engaging ring R, wherein the engaging ring R is inserted into the inside portion 13 of the large-diameter cylinder portion 12 of the bellmouth main body M in such a manner that the large-diameter side end face 31a of the guiding inclined surface 31 is situated on the entrance side of the inside portion 13, and the projection 34 of the engaging ring R is fitted with the inner surface recessed portion of the outwardly facing projection 14 of the large-diameter cylinder portion 12.

In addition, the above-object can also be achieved by a bellmouth, according to a second aspect of the present invention, in which the other opening of the cylindrical-shaped portion 15 includes an inclined cylinder 21 formed so as to be larger in diameter on the deep side thereof than on the end face side thereof, a securing stepped portion 22 formed on the rear surface of the inclined cylinder 21, and a plurality of projecting portions 23 respectively provided in the rear of the inclined cylinder 21.

In addition to this, it is a fourth object of the present invention to provide a system for mounting a bellmouth having the above-mentioned structure onto the wall of a hand hole very easily, quickly and accurately.

This fourth object can be achieved by a concrete block body, according to the present invention, which having a first structure comprises a substantially rectangular-shaped concrete and one or more bellmouths each according to the first aspect of the present invention, and is structured such that, while one or more bellmouths having the first structure are arranged in the same direction, one or more bellmouths having the first structure are buried into the concrete in such a manner that the trumpet-shaped opening(s) 16 of the bellmouth(s) M is or are substantially identical with a given wall surface of the concrete to thereby form an integrally united body as a concrete block body.

In addition to this, the above-mentioned fourth object can also be achieved by a concrete block body, according to the present invention, which having a second structure that comprises a substantially rectangular-shaped concrete and one or more bellmouths each according to the second aspect of the present invention, and is structured such that, while one or more bellmouth(s) having the second structure is or are arranged in the same direction, one or more bellmouth(s) having the second structure is or are buried into the concrete in such a manner that the trumpet-shaped opening(s) 16 of the bellmouth(s) M is or are substantially identical with a given wall surface of the concrete to thereby form an integrally united body as a concrete block body.

Further, it is a fifth object of the invention to provide system capable of installing or setting up a hand hole with the bellmouth having the above-mentioned performance mounted thereon in a given hand hole installation place very easily, quickly and accurately.

This fifth object can be achieved by a hand hole, according to the present invention, having a first structure which comprises one or more bellmouth(s) each according to the first aspect of the present invention, and is structured such that, while one or more bellmouth(s) having the first structure are arranged in the same direction and the trumpet-shaped opening(s) 16 of the bellmouth(s) M is or are substantially identical with the inner wall surface of a hand hole H, one or more bellmouth(s) having the first structure is or are buried into the peripheral wall of the hand hole H to thereby form an integrally united body as a hand hole with a bellmouth.

In addition to this, the fifth object can also be achieved by a hand hole having a second structure which comprises one or more bellmouth(s) each according to the second aspect of the present invention, and is structured such that, while one or more bellmouth(s) having the second structure is or are arranged in the same direction and the trumpet-shaped opening(s) 16 of the bellmouth(s) M is or are substantially identical with the inner wall surface of a hand hole H, one or more bellmouth(s) having the first structure is or are buried into the peripheral wall of the hand hole H to thereby form an integrally united body as a hand hole with a bellmouth.

In enforcing the bellmouth according to the first aspect, the notches 33 in the ring R may be formed in such a manner that it includes one inclined surface 33a on one side thereof or two inclined surfaces 33a respectively on both sides thereof in the circumferential direction of the ring R, and only the other opening of the bellmouth, that is, only the opening on the side of the bellmouth that is situated outside the wall of a hand hole may be covered with a closing cover formed integrally therewith, or both of the inside and outside openings of the bellmouth may be respectively covered with their associated closing covers formed integrally therewith, thereby holding the bellmouth in a sealed manner.

Also, in enforcing the bellmouth according to the second aspect of the invention, the waterproofing ring 25 may be provided on the deep portion of the projecting portions 23 formation portion of the bellmouth, each of the projecting portions 23 may include one inclined surface 23a on one side thereof or two inclined surfaces 23a respectively on both sides thereof in the circumferential direction of the bellmouth, and only the other opening of the bellmouth, that is, only the opening on the side of the bellmouth that is situated outside the wall of a hand hole may be covered with a closing cover formed integrally therewith, or both of the inside and outside openings of the bellmouth may be respectively covered with their associated closing covers formed integrally therewith, thereby holding the bellmouth in a sealed manner.

Further, in enforcing the hand hole having the first structure or the second structure according to the invention, preferably, the hand hole may be enforced in such a manner that the bellmouth(s) is or are buried into the two mutually opposing peripheral walls of the hand hole H.

When connecting a pipe P set forth in embodiments to be discussed later to the above-structured bellmouth, such connection can be completed by a very simple one-touch operation, that is, simply by pushing the pipe P in the axial direction thereof into the bellmouth.

Also, when there arises a situation to detach the thus connected pipe from the bellmouth, the connected condition between the pipe and bellmouth can be removed by a simple two-stage operation, that is, by rotating the pipe slightly in the peripheral direction thereof with respect to the bellmouth and, after then, pulling out the pipe as it is in the axial direction thereof from the bellmouth.

The present disclosure relates to subject matter contained in Japanese Patent Application No. Hei. 10-322464, filed on Nov. 12, 1998, and which is expressly incorporated herein by reference in its entirety.

DETAILED DESCRIPTION OF THE PREFERRED EMBODIMENTS

Figure 2:
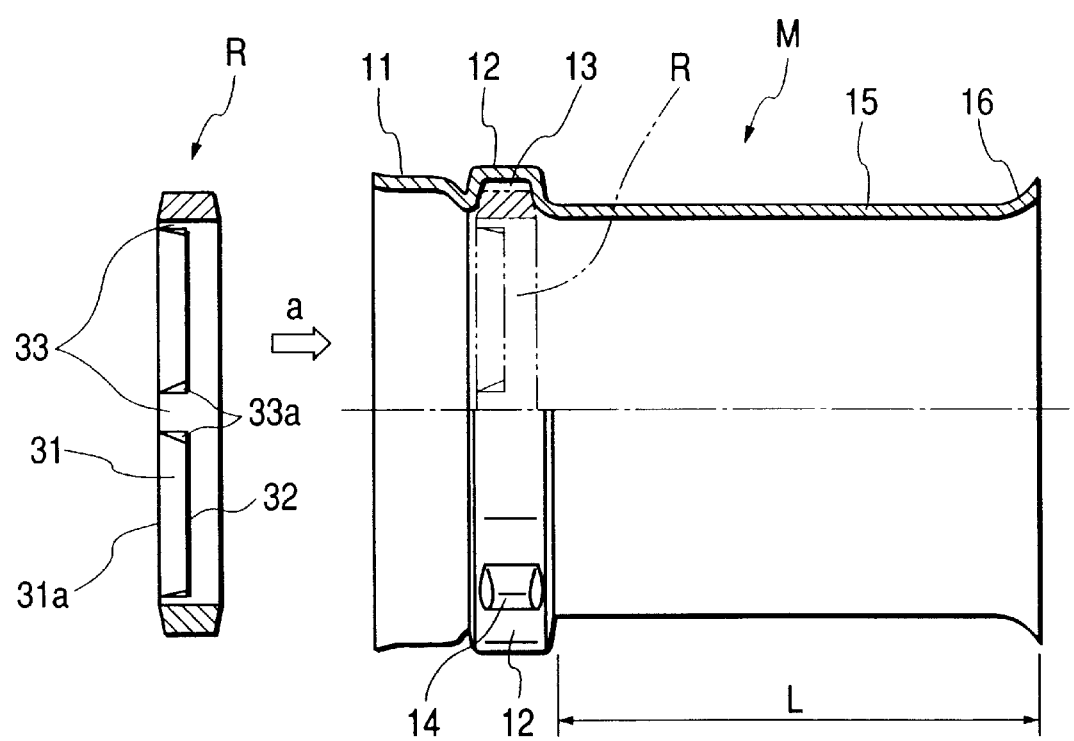
FIG. 2 is a partially longitudinal side section view of the main portions of the first embodiment.
Figure 3:
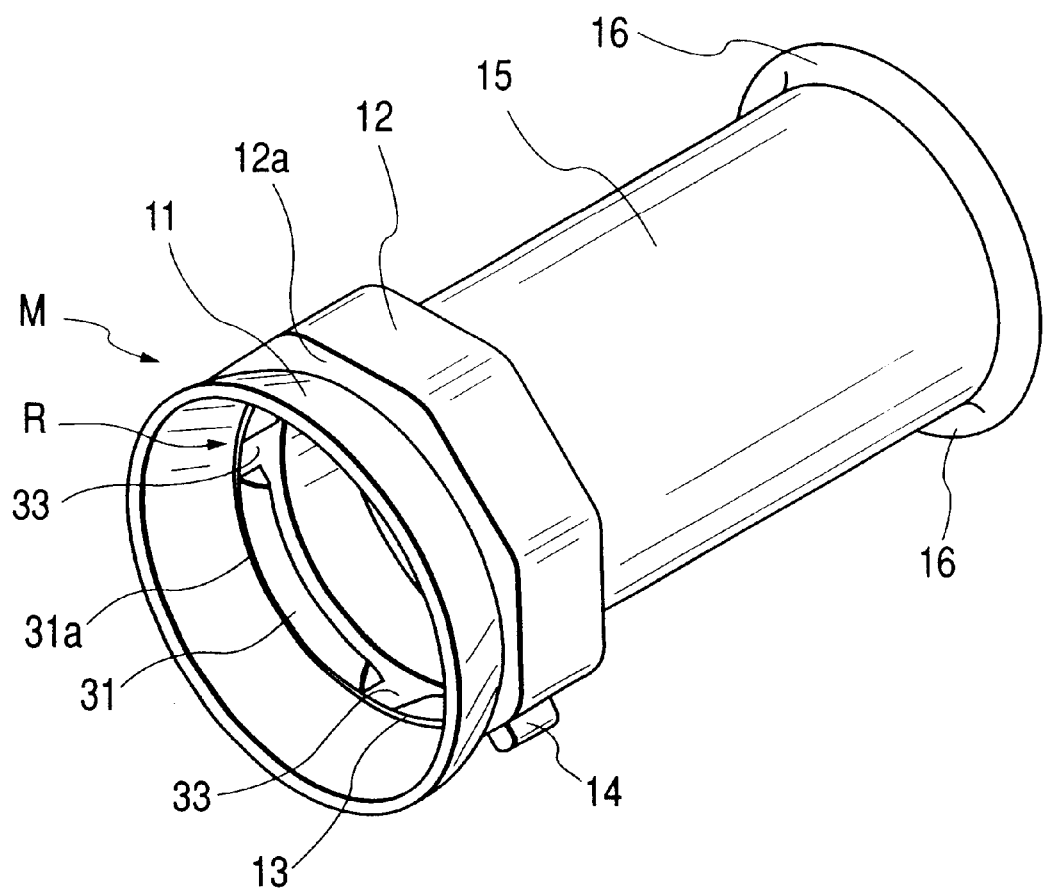
FIG. 3 is a perspective view of the whole of the first embodiment.
Figure 4:
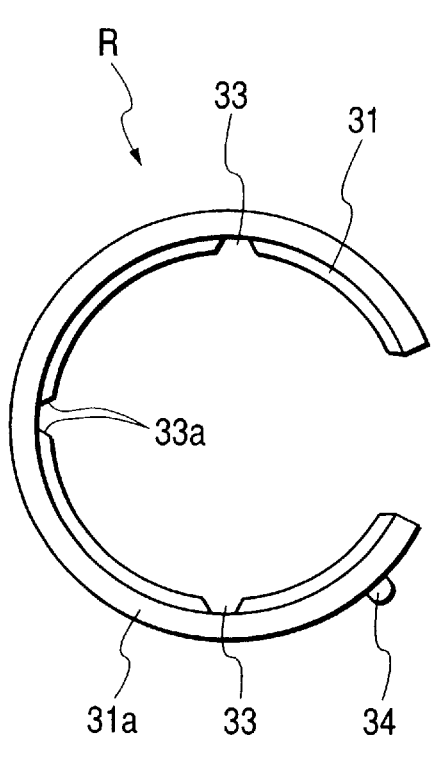
FIG. 4 is a front view of the shape of the end face of a ring employed in the first embodiment.
Figure 5:
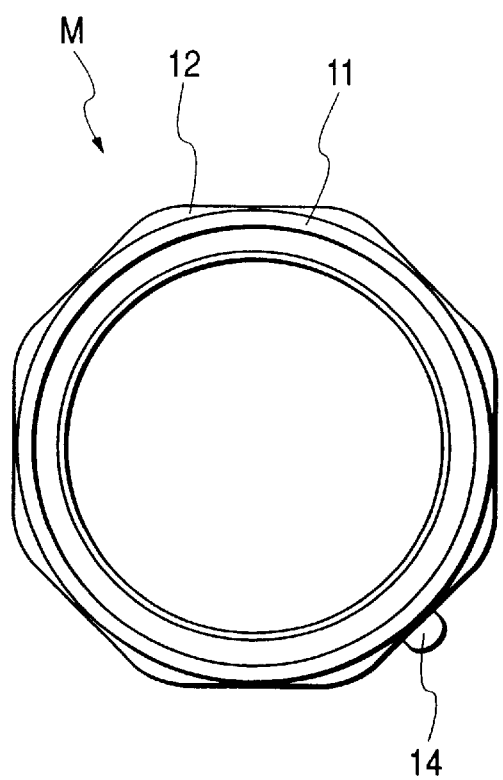
FIG. 5 is a front view of the shape of the end face of a bellmouth main body employed in the first embodiment.
Figure 6:
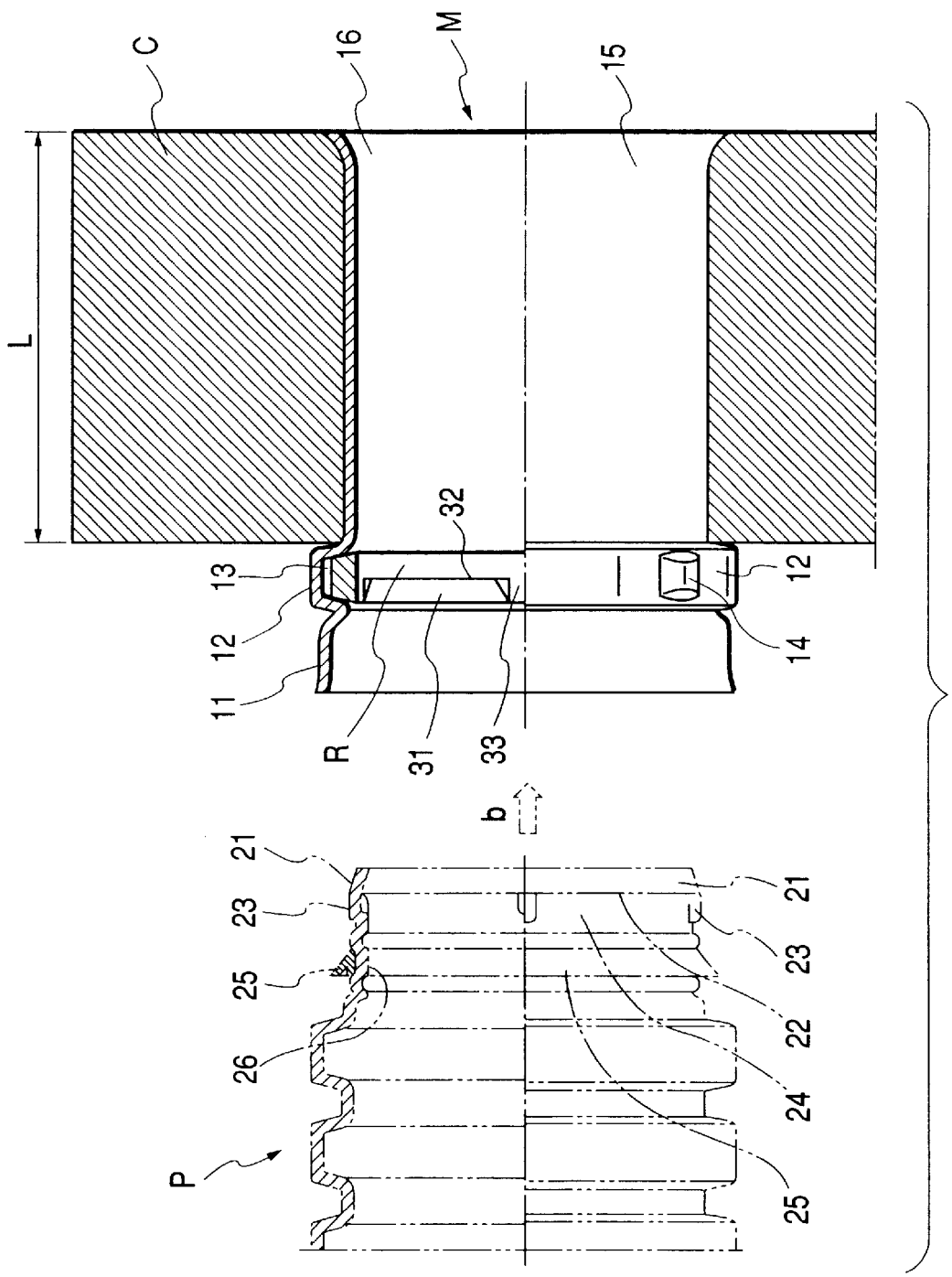
FIG. 6 is a partially longitudinal side view of the first embodiment, showing how it is used.
Figure 7:
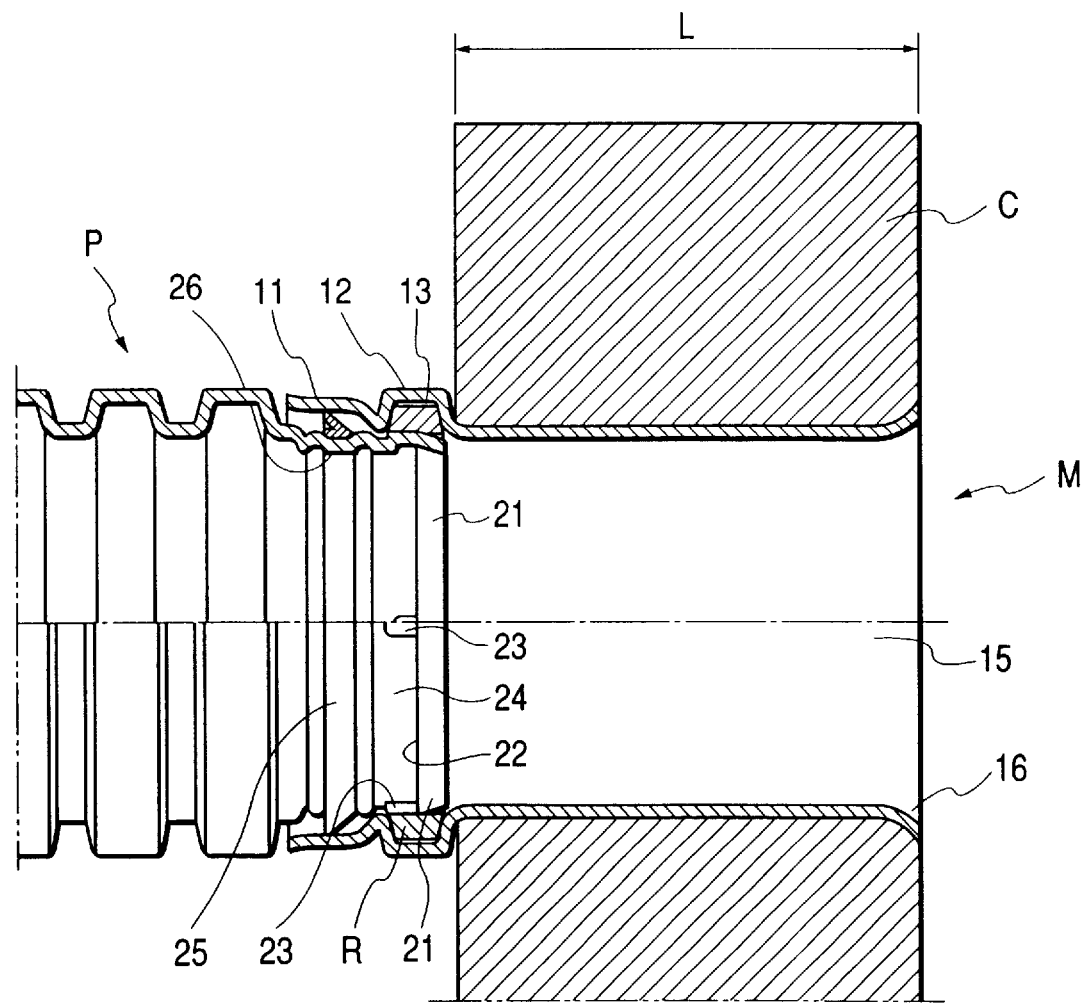
FIG. 7 is a longitudinal section view of the main portions of a pipe, showing how it is connected.
Figure 8:
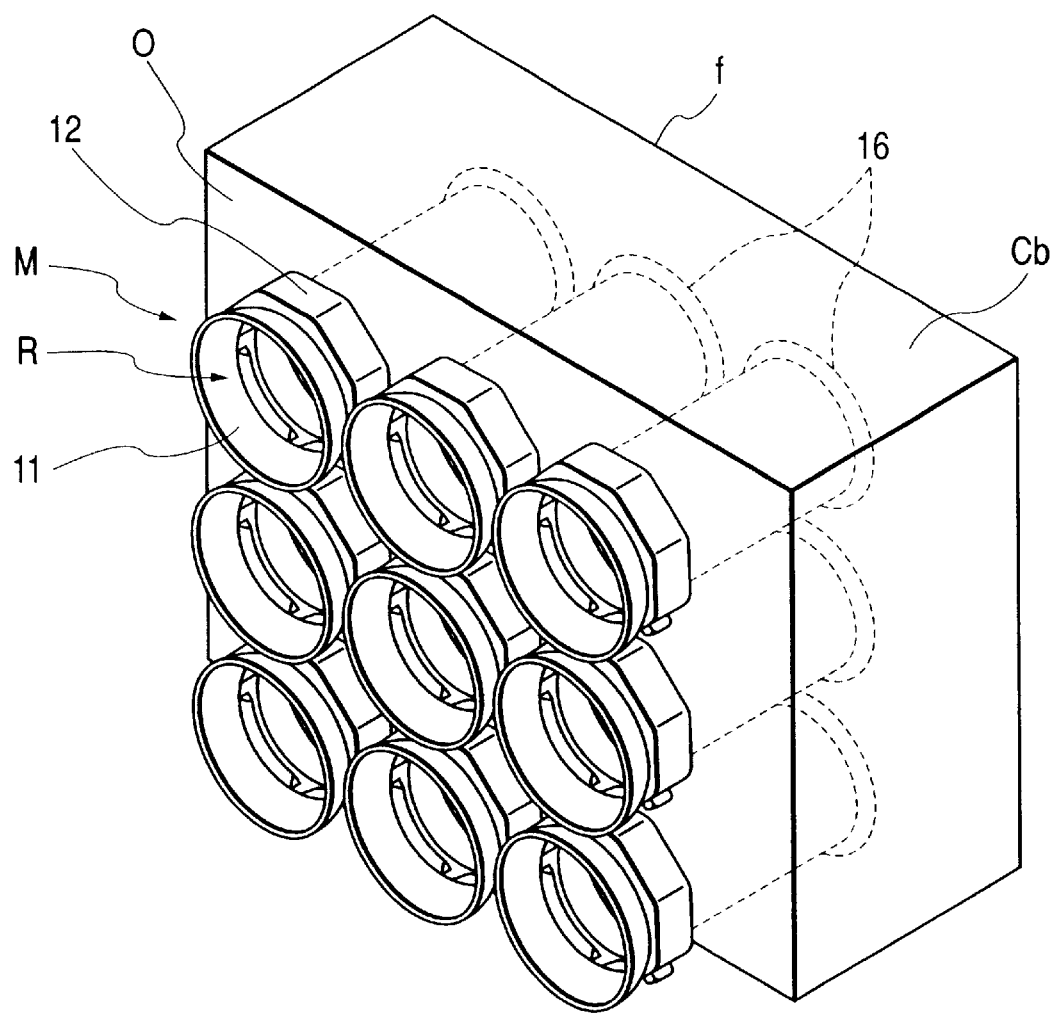
FIG. 8 is a perspective view of nine bellmouths collected together as an integral block body, showing how it is used.
Figure 9:
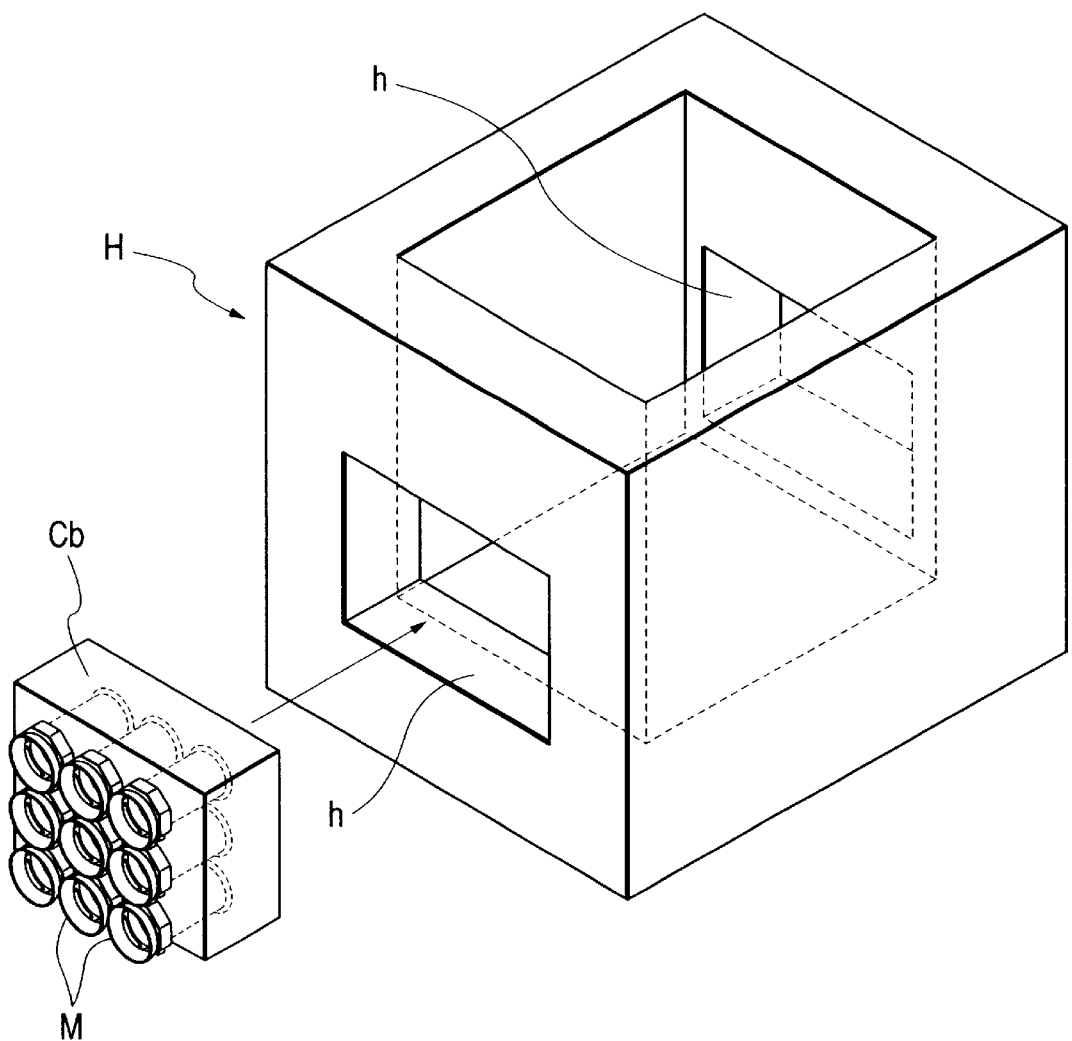
FIG. 9 is a perspective view of the block body, showing a state thereof before it is used.
Figure 10:
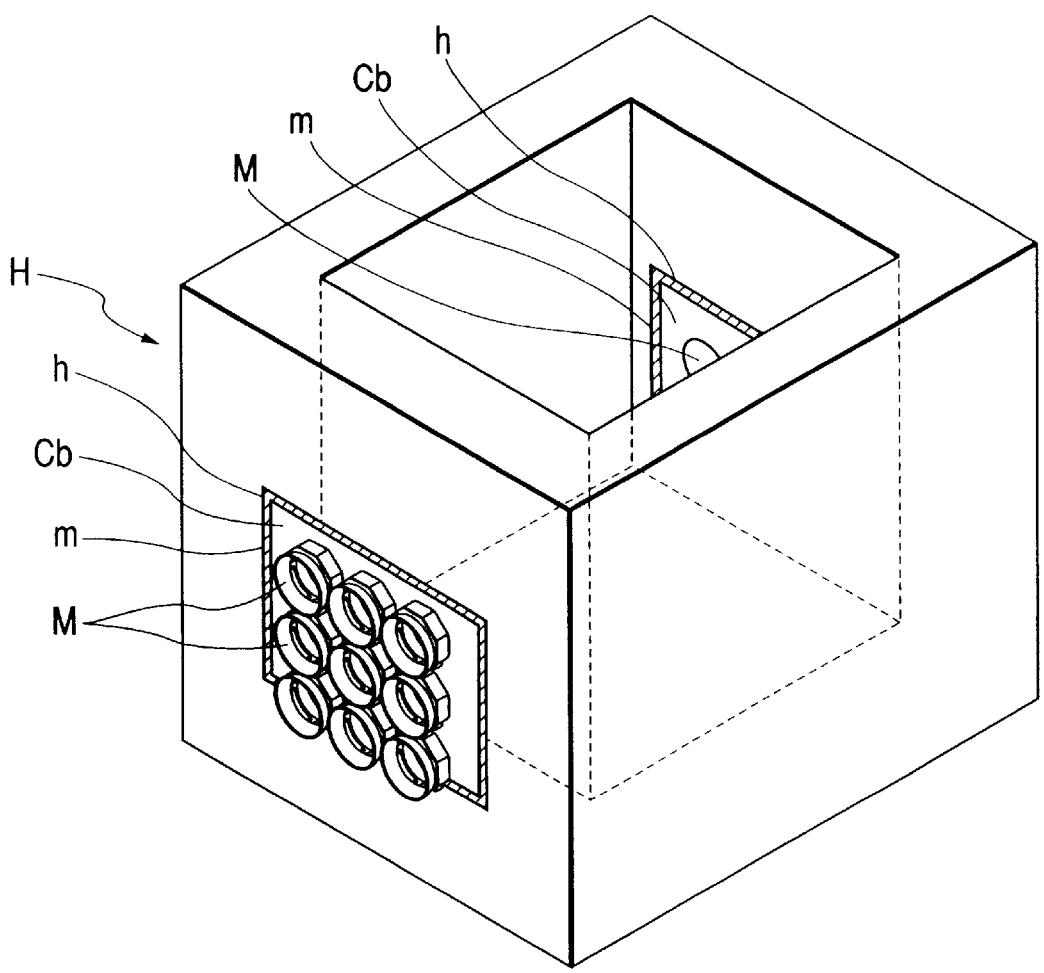
FIG. 10 is a perspective view of the block body, showing a state thereof when it is in actual use.
Figure 11:
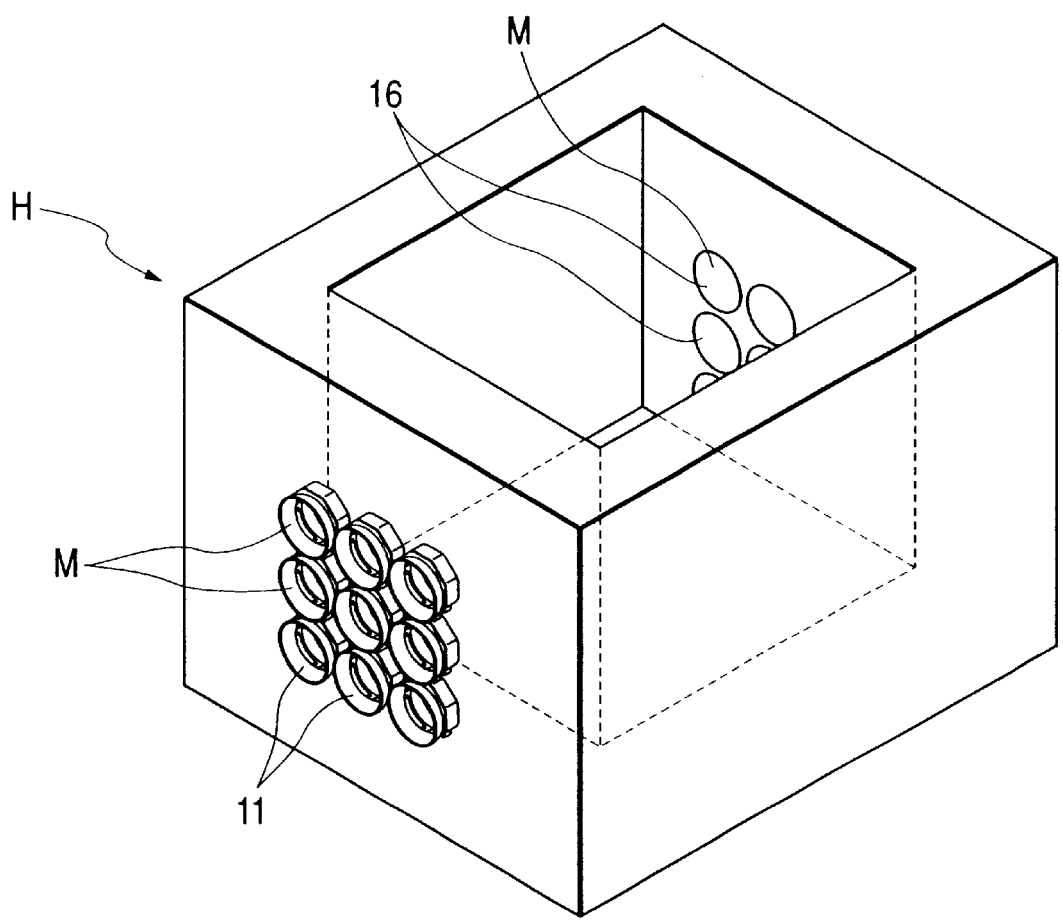
FIG. 11 is a perspective view of the block body, showing a state thereof when it is buried and used in a hand hole.

Now, description will be given below of an embodiment of a bellmouth having a first structure according to the invention with reference to the accompanying drawings. In the drawings, FIGS. 1 to 5 respectively show a bellmouth according to a first embodiment of the invention, whereas FIGS. 6 to 11 respectively show how the present bellmouth is used. Specifically, FIGS. 1 and 2 respectively show a state of the bellmouth in which a ring is detached from the bellmouth, FIG. 3 shows a state of the bellmouth in which the ring is mounted on the bellmouth, and FIGS. 4 and 5 respectively show the side surface of the bellmouth. Also, FIG. 6 shows a state of the bellmouth in which it is mounted on a hand hole, FIG. 7 shows a state of the bellmouth in which a pipe is connected to the bellmouth, FIG. 8 shows a block body in which nine bellmouths are collected together to form an integrally united body, FIG. 9 shows a state of the block body before it is connected to a hand hole, and FIG. 10 shows a state of the block body after it is connected to the hand hole. Further, FIG. 11 shows a hand hole into which the bellmouths have been buried.

Figure 1:
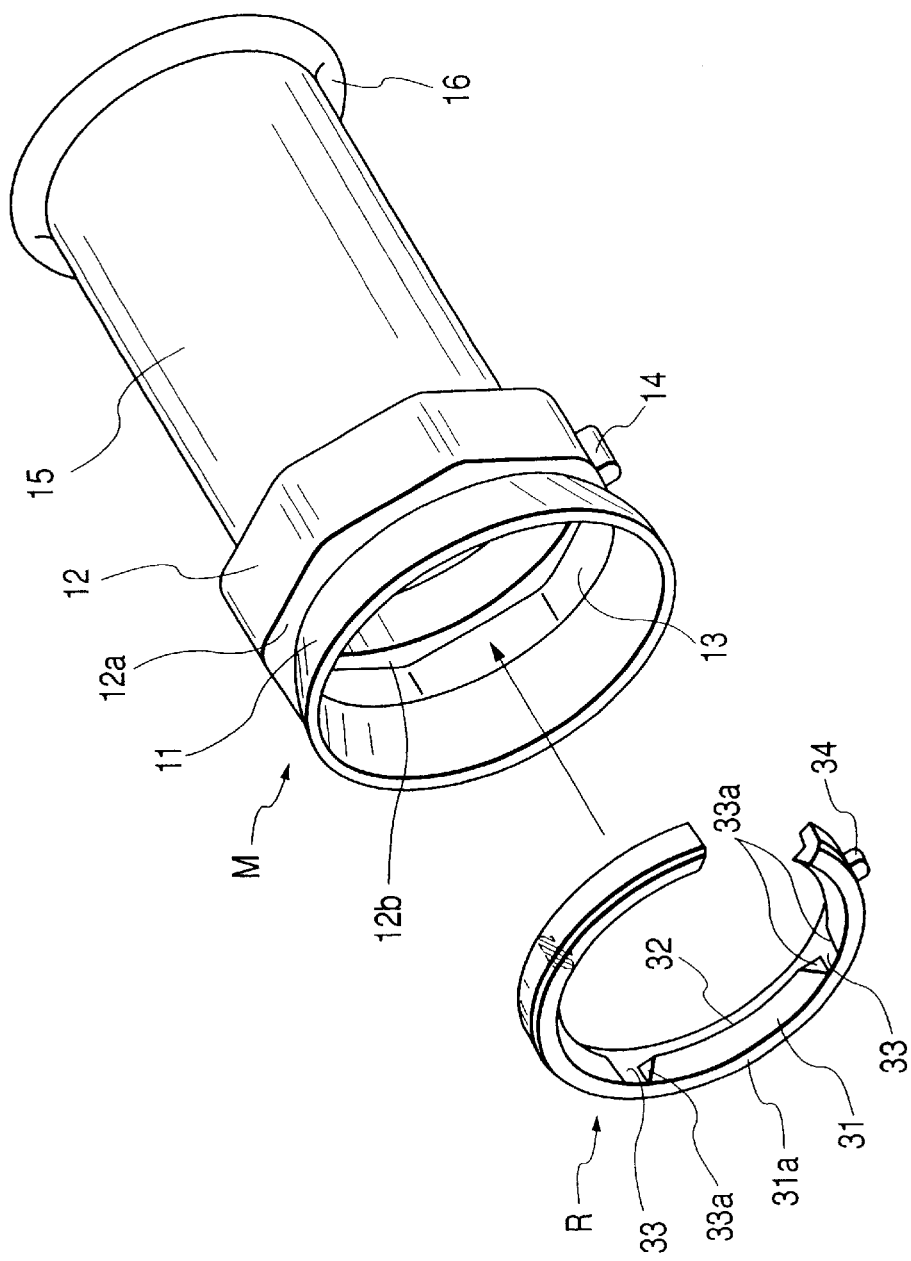
FIG. 1 is an exploded perspective view of main portions of a first embodiment according to the invention.

A bellmouth main body M employed in the first embodiment has a cylindrical shape as a whole. In the bellmouth main body M, one opening thereof, that is, an opening 16 located on the right in FIGS. 1 to 3 is formed in such a manner as to spread wide in a trumpet-like shape and, as shown in FIGS. 6 and 7, the length L of the trumpet-shaped portion and a cylindrical-shaped portion 15 formed so as to be continuous with the trumpet-shaped portion is set in such a manner that it corresponds to the thickness of a concrete wall C in a hand hole. The other opening of the bellmouth main body M, that is, an opening located on the left in FIGS. 1 to 3 is structured such that, at the opening end thereof, there is formed a guide cylinder 11 capable of receiving the leading end portion of a pipe P to be connected to the bellmouth main body M; in the deeper portion thereof than the guide cylinder 11, there is formed a large-diameter cylindrical portion 12 larger in diameter than front and rear walls 12a and 12b respectively formed before and behind the large-diameter cylindrical portion 12 in the axial direction of the pipe; and, on a portion of the large-diameter cylindrical portion 12 in the peripheral direction thereof, there is provided an outwardly facing projection 14 which is formed so as to be capable of producing a cavity on the inner surface side thereof. Now, an engaging ring R, which is produced separately from the bellmouth main body M, has a non-annular shape; in particular, when it is viewed from the side surface thereof, it is formed substantially in a C shape. The ring R includes a guiding inclined surface 31 and a securing stepped portion 32 formed on the deeper side of the guiding inclined surface 31: specifically, the inside diameter of the guiding inclined surface 31 on the one end face 31a side thereof in the width direction thereof is formed large, whereas the inside diameter on the deeper side thereof is formed small; and, the width of the guiding inclined surface 31 is set substantially one half of the width of the ring R. Also, at three positions of the ring R in the peripheral direction thereof, there are respectively formed three notches 33 which have been obtained by cutting out their corresponding portions of the inclined surface 31 and, on both sides of each notch 33, there are formed inclined surface 33a which are inclined in the peripheral direction of the ring R. Further, on the outer peripheral surface of the ring R, there is provided a projection 34 which projects outwardly.

Thus, the engaging ring R is inserted into the bellmouth main body M in the following manner: that is, the large-diameter side end face 31a of the guiding inclined surface 31 is situated on the entrance side of the inner portion 13 of the large-diameter cylindrical portion 12; and, the outwardly projecting projection 34 of the ring R is fitted with the cavity formed in the inner surface of the outwardly facing projection 14 provided on the large-diameter cylindrical portion 12.

The material of the bellmouth main body M and the material of the ring R are not limited specially. However, preferably, for example, it they are formed of polyolefin-system resin such as polyethylene resin (PE), polypropylene resin (PP) or the like, then they can be highly resistant to water and weather as well as can deteriorate in quality little with the passage of time.

The thus structured bellmouth, as shown in FIG. 6, is buried into the concrete wall C of the hand hole in such a manner that, when forming the hand hole, the trumpet-shaped opening 16 is matched to the inner surface of the hand hole and a portion of the other opening is projected from the outer surface of the hand hole. In this manner, there is formed an opening which communicates with the inside and outside of the concrete wall C of the hand hole.

In the leading end portion of a pipe P to be connected to the above-structured bellmouth, or in the leading end portion of a joint member which is previously connected to the leading end of the pipe P, in more particular, as shown in FIGS. 6 and 7, in the open end of such leading end portion, there is formed an inclined cylinder 21 the diameter of which is larger on the deeper side thereof than on the end face side thereof and, in the rear of the inclined cylinder 21, there is formed a cylindrical-shaped portion 24 which is slightly smaller in diameter than the inclined cylinder 21, while the rear surface of the inclined cylinder 21 is formed as a securing stepped portion 22 which can be engaged with the securing stepped portion 32 of the ring R. Also, in the portion of the pipe P which is located in the rear of the inclined cylinder 21, in more particular, at positions thereof in the peripheral direction of the pipe P which respectively correspond to the notches 33 of the ring R, there are respectively provided projecting portions 23. Further, in the rear of the small-diameter cylindrical-shaped portion 24, there are arranged two annular-shaped ribs to thereby form an annular-shaped recessed groove 26 between them, and a rubber ring 55 for waterproofing purpose including an inclined outer peripheral surface which increases in the diameter toward the rear end thereof is fitted with the annular-shaped recessed groove 26, while the diameter of the outer periphery of the rubber ring 25 is set in such a manner that the outer peripheral surface of the rubber ring 25 can be pressure contacted with and closely attached to the inner peripheral surface of the open guide cylinder 11 disposed in the bellmouth main body M.

In the first structure, each of the projecting portions 23 provided in the pipe P is shown in such a manner that it has a rod-like shape. However, this is not limitative but, as in the inclined surfaces 33a, 33a formed on both sides of the notches 33 of the ring R as well as as in projecting portions provided on a bellmouth main body M having a second structure (which will be discussed later), each projecting portion 23 can also be shaped in such a manner that it includes two inclined surfaces respectively on both sides thereof in the peripheral direction thereof (see FIG. 12). In this case, the inclined surfaces 33a of the notches 33 in the ring R are not always necessary.

To connect the thus structured pipe P to the bellmouth, as shown by an arrow mark b in FIG. 6, the open end of the pipe P may be simply pushed toward the guide cylinder 11 of the bellmouth. In this connecting operation, the leading end portion of the pipe P, that is, the inclined cylinder 21 of the pipe P is contacted with the guiding inclined surface 31 of the ring R and is then moved into the deeper portion of the ring R while spreading the guiding inclined surface 31 in the peripheral direction of the ring R and, at the time when the engaging stepped portion 22 of the pipe P has passed the guiding inclined surface 31, the spreading force of the inclined cylinder 21 of the pipe P in the peripheral direction of the ring R disappears; and, due to the disappearance of the spreading force, the ring R is restored in its small-diameter direction with a snap, that is, the snap sound notifies the end of the push-in operation of the pipe P. The restoration of the ring R in the small-diameter direction brings the securing stepped portion 22 of the pipe P into engagement with the deeper-side securing stepped portion 32 of the guiding inclined surfaces 33a of the ring R to thereby prevent the pipe P from moving in its removing direction. In this state, the plurality of projecting portions 23 of the pipe P are respectively fitted with the plurality of notches 33 of the ring R, thereby preventing the pipe P from moving in the peripheral direction thereof easily. In this manner, by a very simple one-touch operation to simply push the pipe P in the axial direction of the pipe P into the bellmouth, connection of the pipe P to the bellmouth can be completed.

When there arises a need to remove the mutually connected condition between the pipe P and bellmouth, if the pipe P is rotated in the peripheral direction thereof to thereby rotate the projecting portions 23 in the peripheral direction thereof, then, while spreading the diameter of the ring R in the peripheral direction thereof, the projecting portions 23 which have been fitted with the fitting engagement the notches 33 can be removed from their fitting engagement with the notches 33 and guided onto the guiding inclined surfaces 31 and thus the diameter of the securing stepped portion 32 of the ring R can be made larger than the diameter of the securing stepped portion 22 formed in the back surface of the inclined cylinder 21 to thereby remove the engagement between the pipe and bellmouth. That is, in this state, the pipe P may be pulled from the bellmouth. In this manner, to detach the pipe P from the bellmouth when the need arises for one reason or another, the pipe P can be detached by a simple two-stage operation, that is, by rotating the pipe P slightly in the peripheral direction thereof and, after then, pulling out the pipe P from the bellmouth in the axial direction of the pipe P.

Now, FIG. 8 shows an embodiment of a concrete block body. In the present embodiment of the concrete block body, a total of 9 bellmouths, which have been respectively structured in the above-mentioned manner and arranged three in the horizontal direction and three in the vertical direction (that is, 3×3=9), are collected together in a mutually adjoining manner and disposed in the same direction, and also their respective trumpet-shaped openings 16 are opened in such a manner as to be identical with a specific wall surface f, that is, a surface (on the deeper side in FIG. 8) to be disposed on the inner surface side of a hand hole, while the guide cylinders 11 and large-diameter cylindrical portions 12 located on the other side of the bellmouths M are projected outwardly from the opposite wall surface o; and, in this state, the nine bellmouths M are buried into a square-shaped or rectangular-shaped concrete block body Cb and are united together integrally into a single block body.

The concrete block body Cb shown in the present embodiment is structured such that the thickness thereof is set substantially equal to the wall thickness of a hand hole into which the concrete block body Cd is to be mounted and the size of the rectangular-shaped surface thereof is formed slightly smaller than a through hole h which has been previously formed in the hand hole and also into which the concrete block body Cb is to be mounted.

Here, as shown in FIG. 9, there is prepared a box-shaped hand hole H in which two rectangular-shaped through holes have been previously formed in the two mutually opposing peripheral walls thereof. And, if the thus structured concrete block body Cb, as shown in FIG. 10, is inserted in such a manner that the periphery of the concrete block body Cb is sealed with suitable bonding material such as cement mortar or waterproofing seal material m, then the nine bellmouths M can be mounted and fixed to the hand hole H at the same time. By the way, the number of bellmouths M to be buried into the shown concrete block body Cb to form an integrally united body may be the number that is required by the hand hole H into which the bellmouths M are to be mounted. Of course, depending on cases, a single bellmouth X can also be used.

Now, referring to a structure shown in FIG. 11, when forming the hand hole H, a total of nine bellmouths M consisting of bellmouths M arranged by threes in both of the horizontal and vertical directions (that is, 3×3=9) are buried into the two mutually opposing peripheral walls of the hand hole H in such a manner that the nine bellmouths M are collected together in a mutually adjoining manner and arranged in the same direction, and also their respective trumpet-shaped openings 16 are opened so as to be substantially identical with the inner wall surface of the hand hole H, while the portions of the bellmouths M on the other-side guide cylinders 11 side are projected out from the outer wall surface of the hand hole H. Thanks to this structure, there can be formed the hand hole H with bellmouths previously mounted at the required positions thereof.

The number of bellmouths M previously buried integrally into the wall surfaces of the shown hand hole H may also be the number that is required by the hand hole H. Of course, depending on cases, a single bellmouth M can also be used. Also, the number of peripheral walls into which the bellmouths M are buried is not always limited to the two mutually opposing peripheral walls but, for example, depending on the forming direction of a pipe passage, the bellmouths M may be buried into a single peripheral wall, or two, or three or four wall surfaces.

Figure 12:
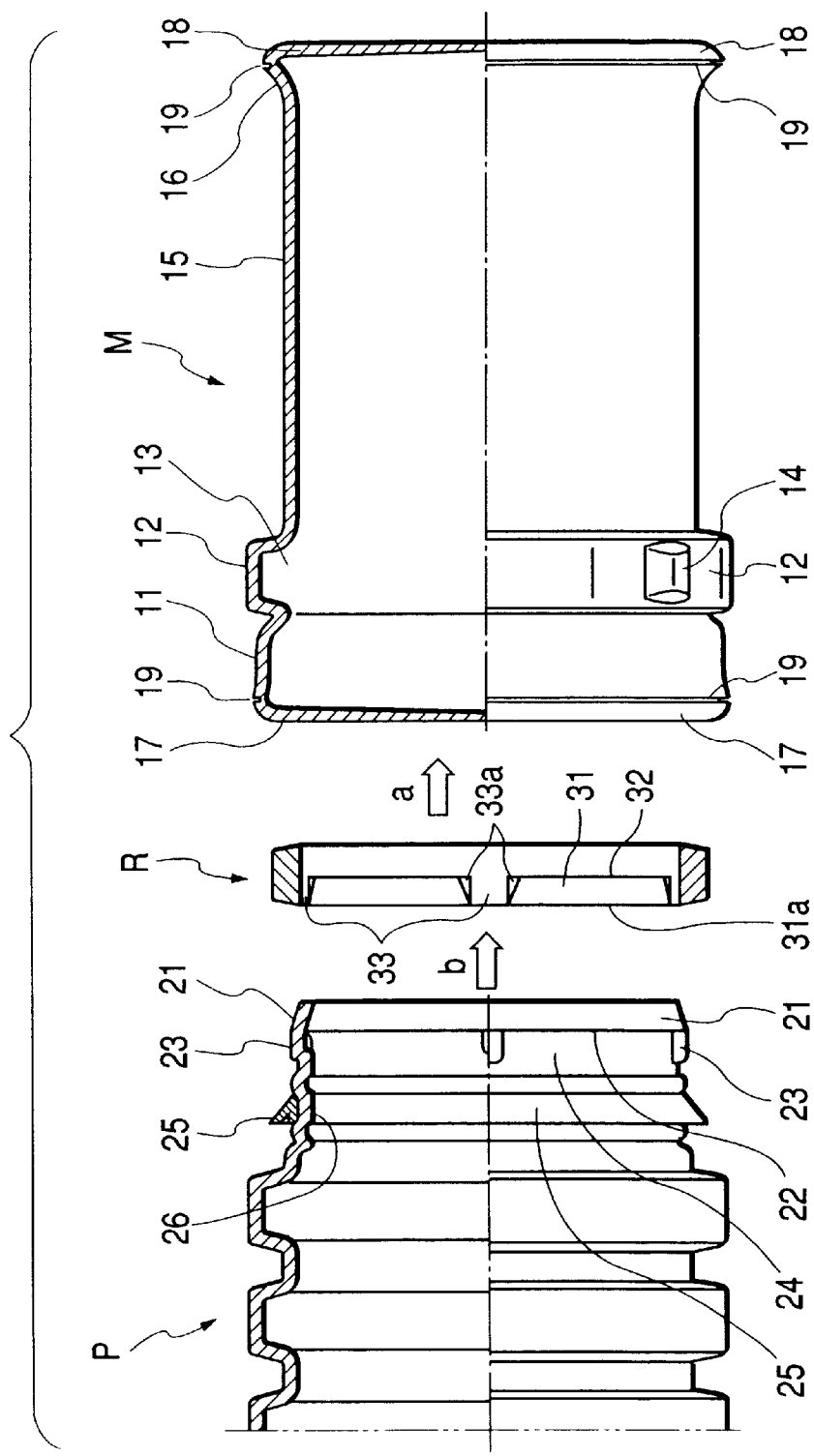
FIG. 12 a partially longitudinal side section view of the main portions of a second embodiment according to the invention.

Now, FIG. 12 shows a second embodiment of a bellmouth M according to the invention. Although the present bellmouth M is shown in such a manner that the specific structure thereof is similar to the structure employed in the previously described first embodiment. However, the present structure is different from the previously shown structure of the first embodiment in that cover members 17 and 18 respectively for closing the guide cylinder 11 side opening and trumpet-shaped opening 16 are formed integrally with the guide cylinder 11 side opening and trumpet-shaped opening 16 through small-thickness portions 19 and 19 which also serve as marks indicating cutting portions.

Figure 13:
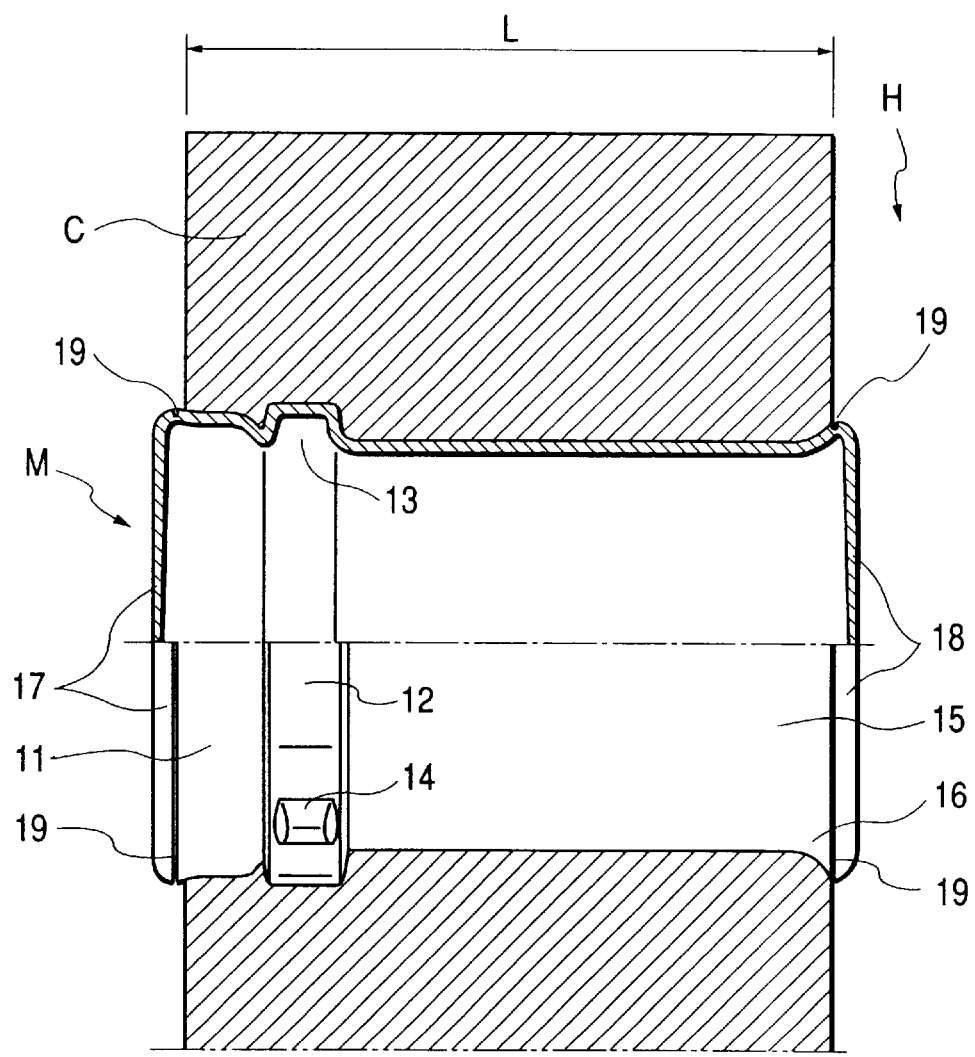
FIG. 13 a partially longitudinal side section view of the second embodiment, showing how it is used.

With use of this structure, as shown in FIG. 13, when mounting the bellmouth M onto the concrete peripheral wall C of the hand hole H, for example, the cutting mark and small-thickness portion 19 formed on the trumpet-shaped opening 16 side may be disposed so as to be identical with the inner surface of the concrete peripheral wall C, and the guide cylinder 11 side of the bellmouth M may be disposed so as to project out from the outer surface of the concrete peripheral wall C to a suitable extent; however, in FIG. 13, the cutting mark and small-thickness portion 19 formed on the guide cylinder 11 side is disposed in such a manner that it is almost identical with the outer surface of the concrete peripheral wall C or projects slightly therefrom.

According to this structure, at the time when a pipe passage forming pipe P is connected to the bellmouth M, at first, the cutting mark and small-thickness portion 19 formed on the outer side of the hand hole H is cut and the outside cover member 17 is thereby removed from the bellmouth M so that the bellmouth M is turned into an open state and, as shown in FIG. 12, a ring R is fitted into the guide cylinder 11 in such a manner as shown by an arrow line a and, after then, the pipe P may be inserted into the ring R and bellmouth M in such a manner as shown by an arrow line b. In this case, if necessary, the cover member 18 on the inside of the hand hole H may also be cut and removed along the small-thickness portion 19; however, in a case in which an operation to insert a cable or the like into the pipe passage is not executed immediately, if the cover member 18 is left as it is, then the inside of the pipe passage can be kept clean. The cutting and removal of the cover member 18 on the inner side of the hand hole H may be carried out at the time when the cable or the like is inserted into the pipe passage.

With use of the bellmouth M with both ends closed, when the bellmouth M is mounted and buried into the concrete peripheral wall C and also up to the time when the pipe P is connected to the bellmouth M after the bellmouth M is mounted and buried into the hand hole H, it is possible not only to prevent the concrete from flowing into the bellmouth M and hardening and closely sticking to the bellmouth M, but also to prevent other foreign objects from entering the inside of the bellmouth M. Also, when connecting a necessary number of pipes P to the hand hole H, the cover member 17 of the bellmouth M may be cut and removed by an amount equivalent to the necessary number of pipes P; and, when the number of bellmouths M previously mounted into the hand hole H is large, if the remaining bellmouths M are left with their respective covers on, then not only the inside portions of the bellmouths M can be protected but also it is possible to prevent earth and sand or water from entering the inside portion of the hand hole H through the bellmouths M.

Figure 14:
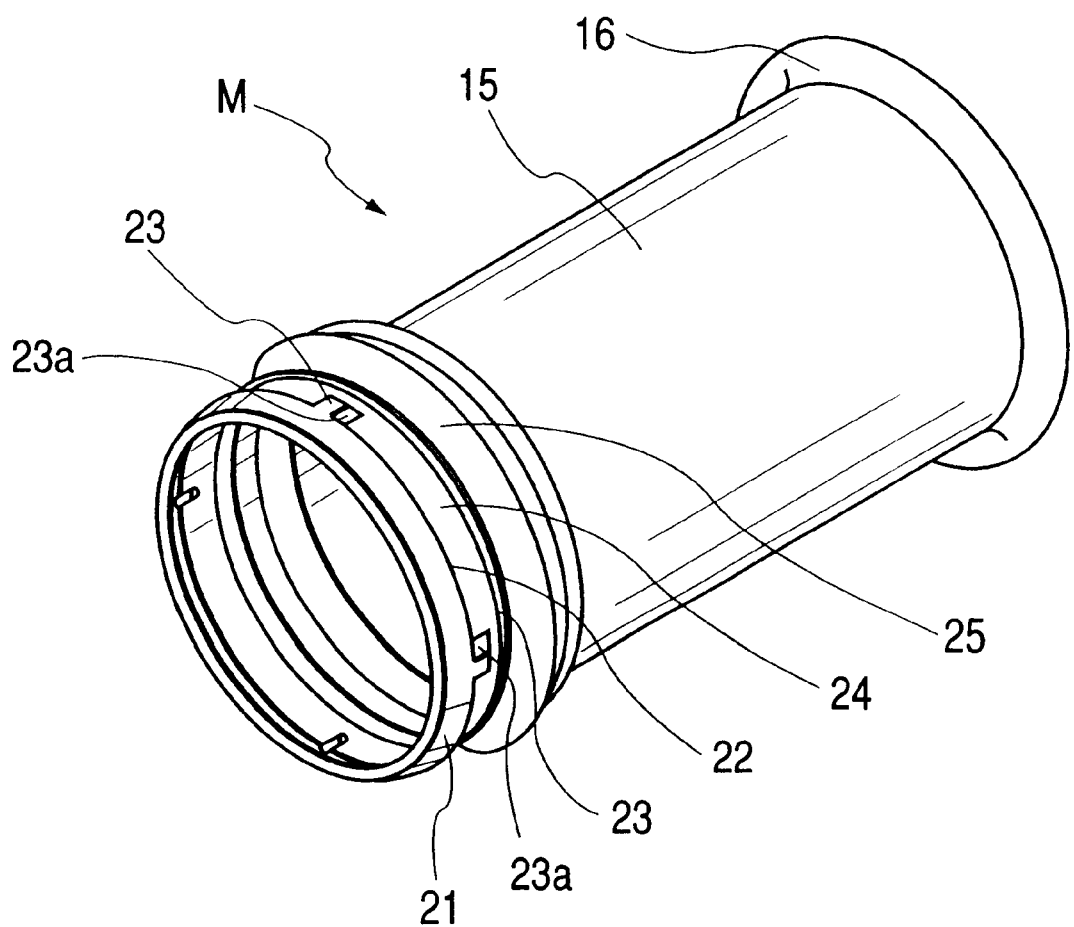
FIG. 14 is a perspective view of the whole of an embodiment having a second structure according to the invention.
Figure 15:
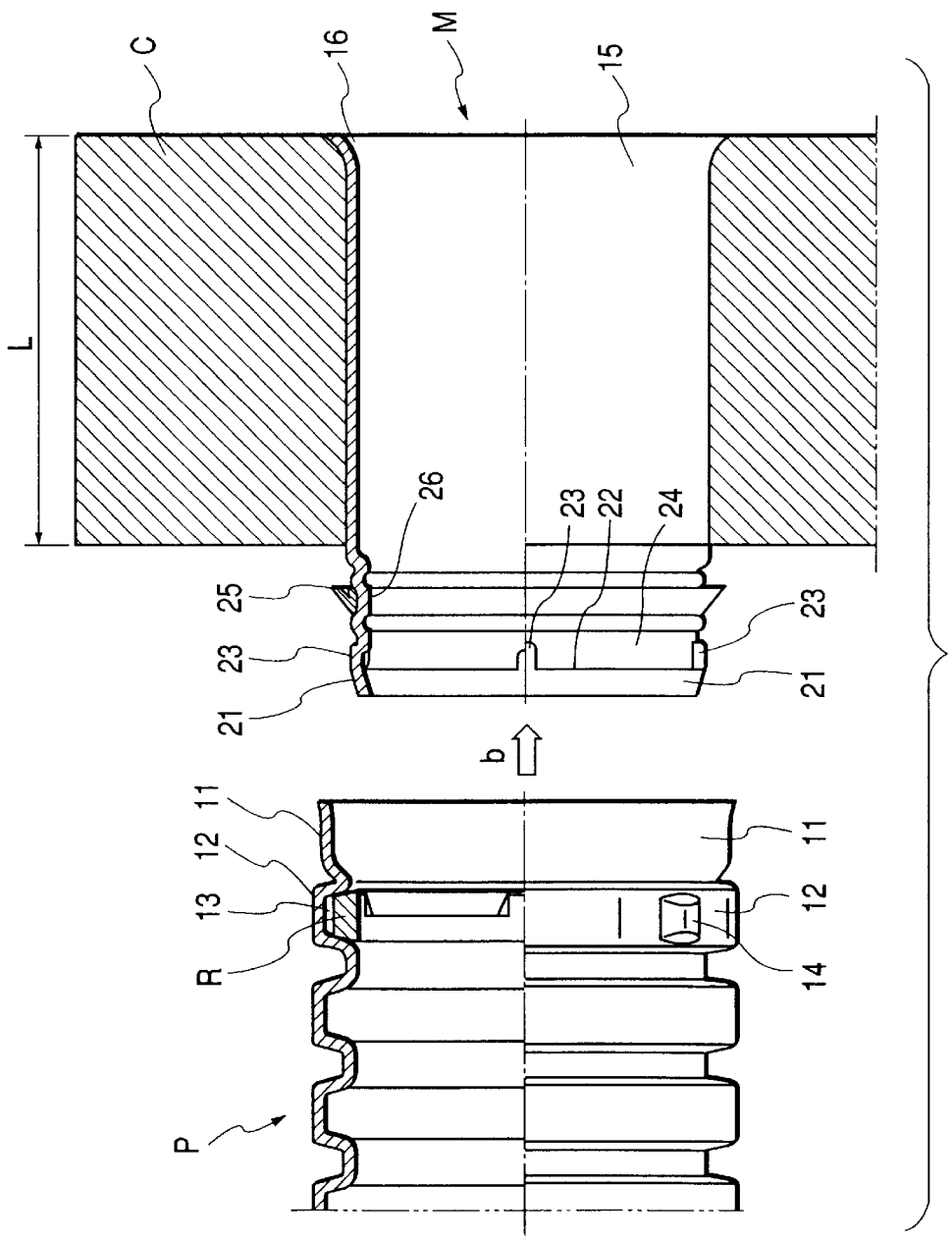
FIG. 15 a partially longitudinal side section view of the above embodiment having the second structure, showing how it is used.
Figure 16:
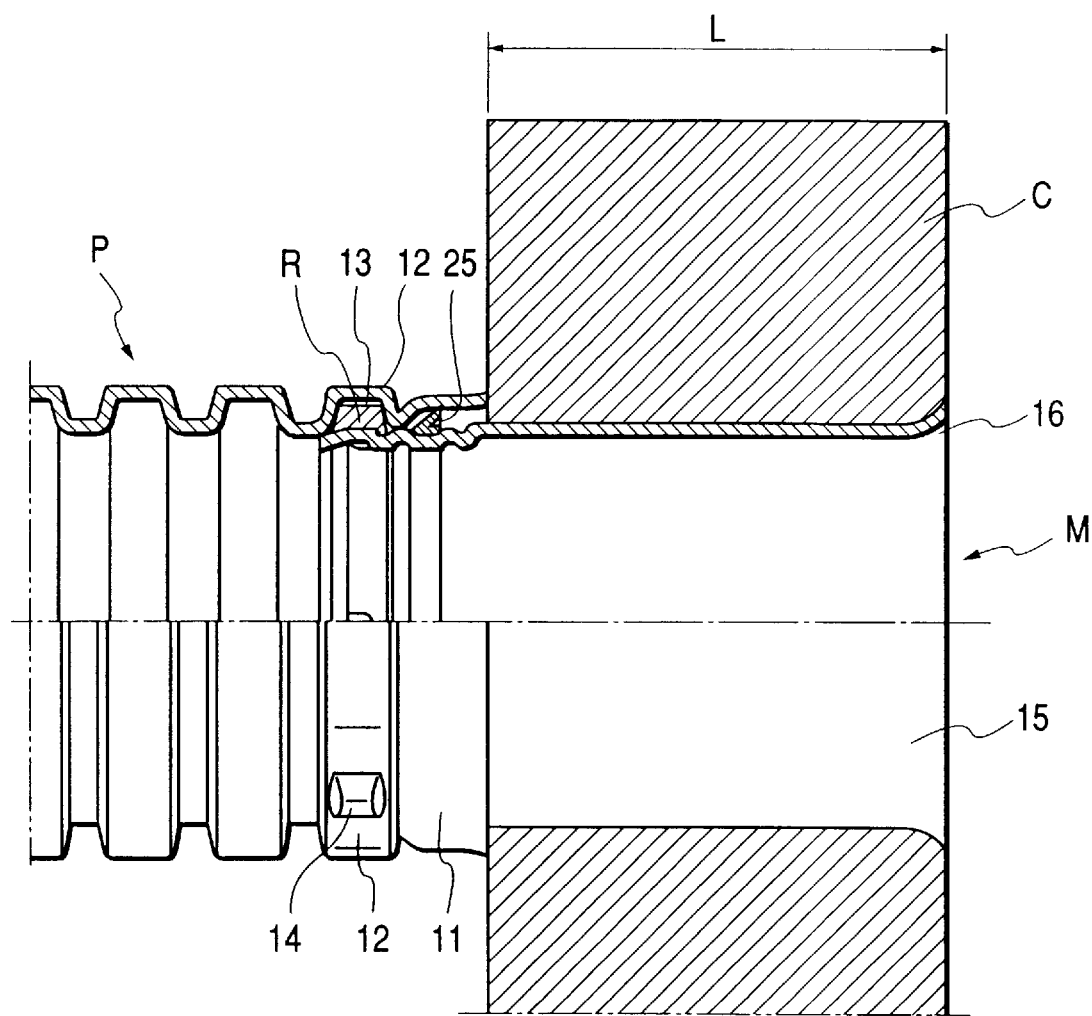
FIG. 16 a partially longitudinal side section view of the above embodiment having the second structure, showing how a pipe is connected thereto.

Now, FIGS. 14 to 16 respectively show an embodiment of a bellmouth M having a second structure, in which the leading end joint structure of the pipe P to be connected to the bellmouth M employed in the previously described first embodiment is formed in the bellmouth M according to the present embodiment. That is, in the present bellmouth M, an opening 16 located on such side of the bellmouth M that is disposed inside a hand hole is formed in a spreading manner like a trumpet shape, an opening located on such side of the bellmouth X that is disposed outside the hand hole includes an inclined cylinder 21 the diameter of which is small on the opening end side thereof and large on the deep side thereof, the portion of the last-mentioned opening that is located in the rear of the inclined cylinder 21 is formed as a small-diameter portion 24, the rear surface of the inclined cylinder 21 is formed as a securing stepped portion 22, four projecting portions 23 respectively having the same height as the inclined cylinder 21 are provided in the rear of the inclined cylinder 21, in more particular, at four positions on the outer peripheral surface of the small-diameter portion 24 in the peripheral direction thereof, and each of the four projecting portions 24 includes two inclined surfaces 23a respectively formed on both sides thereof in the peripheral direction. Also, in the rear of the small-diameter portion 24 on which the projecting portions 23 are provided, there are arranged two annular-shaped ribs to thereby form an annular-shaped groove 26 between them, and a rubber ring 25 for waterproofing purpose is fitted with the annular-shaped recessed groove 26, while the diameter of the outer periphery of the rubber ring 25 is set in such a manner that the outer peripheral surface of the rubber ring 25 can be pressure contacted with the inner peripheral surface of a guide cylinder 11 disposed in a pipe P which is to be fitted with the outer surface of the present bellmouth M.

To the thus structured bellmouth M, there is connected a pipe P which, as shown in FIGS. 15 and 16, includes a similar joint structure to the joint structure provided on the side of the bellmouth M employed in the previously described first embodiment that is to be connected to the pipe P, that is, there is connected a pipe P structured such that it includes a guide cylinder 11 in the open end thereof and the above-mentioned ring R is mounted into the inside portion 13 of a large-diameter portion 12 formed on the deeper side of the pipe P than the guide cylinder 11. With no need to describe in detail, in this case as well, it can be easily understood that the connection of the pipe P to the bellmouth X can be completed by a simple operation, that is, by moving the pipe p in the axial direction thereof with respect to the bellmouth M.

Although not shown in the drawings, it can be easily understood that the bellmouth M employed in the present embodiment can also be enforced in the following manner: that is, one of the two openings thereof, for example, only the opening disposed outwardly of the wall of the bellmouth M includes a closing cover formed integrally therewith, or both of the inside and outside openings of the bellmouth M include their respective closing covers formed integrally therewith, whereby the bellmouth X is formed in such a manner that one side thereof is closed, or the bellmouth M is formed in such a manner that both sides thereof are closed, that is, the bellmouth M is formed in a sealed manner.

Also, although illustration and detailed description thereof are omitted, it is also possible to form a concrete block body in the following manner: that is, one or more bellmouth(s) M each having the second structure shown in FIG. 14 is or are used and, similarly to the concrete block body Cb shown in FIG. 8, in a state in which the bellmouth (s) M is or are all arranged in the same direction, the bellmouth(s) M is or are buried into a substantially rectangular-shaped concrete in such a manner that the trumpet-shaped opening(s) of the bellmouth(s) M is or are all substantially identical with a given wall surface of the concrete to thereby form an integrally united body, that is, a concrete block body.

Further, it can also be easily understood that a hand hole can be formed in the following manner: that is, similarly, one or more bellmouth(s) M each having the second structure shown in FIG. 14 is or are used and, as in the hand hole H shown in FIG. 11, in a state in which one or more bellmouth (s) M is or are all arranged in the same direction, the bellmouth(s) M is or are buried into the peripheral wall of a hand hole in such a manner that the trumpet-shaped opening (s) of the bellmouth(s) M is or are all substantially identical with the inner wall surface of the hand hole to thereby form an integrally united hand hole. That is, the concrete block body and hand hole according to the invention can be enforced in this manner.

Although the description has been given heretofore of the embodiments that can be believed to be representative of the invention, the invention is not always limited to these embodiments. For example, in the illustrated embodiments, the ring R includes the inclined surface 31 which is formed so as to extend only about one-half of the width of the ring R in the width direction thereof. But, the inclined surface 31 can also be formed in other manners; for example, it can be formed as an inclined surface which inclines toward the deep side thereof over the whole width of the ring R in the width direction thereof and the deep-side end face of the inclined surface is used as the securing stepped portion 32. That is, various changes and modifications are possible, provided that they can meet the above-mentioned requirements of the invention, can attain the above-mentioned objects of the invention, and can provide the following effects of the invention.

As can be already seen clearly from the foregoing description, since a bellmouth according to the invention includes a pipe joint mechanism formed integrally therewith and disposed in the end portion of an opening thereof located on the outside of a hand hole, there can be provided an outstanding effect that, when connecting a pipe having a given structure in the end portion thereof to the present bellmouth, the connection of the pipe to the bellmouth can be completed by a one-touch or simple operation, that is, by simply pushing the pipe in the axial direction thereof toward the bellmouth. Therefore, there can be expected the following remarkable effects: that is, even if the bellmouths to be mounted onto the hand hole adjoin each other, the bellmouths can be uniformly mounted onto the hand hole by the above-mentioned simple operation, which makes it possible to mount the bellmouths onto the hand hole closely to each other, to form a large number of pipe passages, and thus to lay down a larger number of cables.

Also, when there arises a need to detach a pipe, which has been connected to the bellmouth, from the bellmouth, the connected condition of the pipe to the bellmouth can be removed very quickly by a simple two-stage operation, that is, by rotating the pipe slightly in the peripheral direction thereof with respect to the bellmouth and, after then, pulling out the pipe as it is in the axial direction thereof from the bellmouth.

And, according to another aspect of the invention, since, in a state in which one or more bellmouth(s) each having the above-mentioned structure is or are arranged in the same direction, the bellmouth(s) is or are buried into a substantially rectangular-shaped concrete in such a manner that the trumpet-shaped opening(s) thereof is or are substantially identical with a given wall surface of the concrete to thereby form an integrally united concrete block body, the bellmouth (s) each having the above-mentioned effects can be mounted onto the wall of a hand hole very easily, quickly and accurately.

Also, according to still another aspect of the invention, since, in a state in which one or more bellmouth(s) each having the above-mentioned structure is or are arranged in the same direction and also in a state in which the trumpet-shaped opening(s) thereof is or are substantially identical with the inner wall surface of a hand hole, the bellmouth(s) is or are buried into the peripheral wall of the hand hole to thereby form an integrally united a hand hole, the hand hole with the bellmouth(s) each having the above-mentioned effects mounted thereon can be installed in a given hand hole installation place very easily, quickly and accurately.

While there has been described in connection with the preferred embodiment of the invention, it will be obvious to those skilled in the art that various changes and modifications may be made therein without departing from the invention, and it is aimed, therefore, to cover in the appended claim all such changes and modifications as tall within the true spirit and scope of the invention.

What is claimed is:

1. A bellmouth with a joint comprising:
   a bellmouth main body including:
   a cylindrical-shaped portion having a first opening disposed at its one end so as to spread in a trumpet-like shape, and a second opening disposed at its other end and provided with an open guide cylinder capable of connecting a pipe thereto,
   a large-diameter cylinder portion formed in a deep portion of said second opening continuous with said open guide cylinder and having a diameter larger than front and rear walls extending in an axial direction of said cylindrical-shaped portion, and an outwardly facing projection disposed in a portion of said large-diameter cylinder portion, and
   a separately produced engaging ring having a non-annular or substantially C-like cross-sectional shape, said engaging ring including:

a guiding inclined surface having a large inside diameter on a width direction one end face side thereof and having a small inside diameter on a deep side thereof, a securing stepped portion formed on the deep side thereof, a plurality of notches respectively formed by cutting out said inclined surface, and a projection provided on and projected from a portion of the outer peripheral surface of said engaging ring, and wherein said engaging ring is inserted into an inside portion of said large-diameter cylinder portion of said bellmouth main body such that said large-diameter side end face of said guiding inclined surface is situated on an entrance side of said inside portion, and also such that said projection on the outer peripheral surface of said engaging ring is fitted with the inner surface recessed portion of said outwardly facing projection of said large-diameter cylinder portion.

2. The bellmouth with a joint as set forth in claim 1, wherein each of said notches of said engaging ring includes, on at least one side thereof in the circumferential direction of said engaging ring, an inclined surface.

3. The bellmouth with a joint as set forth in claim 1, wherein at least one of said first and second openings is temporally closed by a cover member.

4. A bellmouth with a joint comprising:

a cylindrical-shaped portion having a first opening disposed at its one end so as to spread in a trumpet-like shape, and a second opening disposed at its other end;

an inclined cylinder which is formed adjacent to said second opening and larger in diameter on a deep side thereof than an end face thereof;

a securing stepped portion formed on a rear surface of said inclined cylinder; and a plurality of circumferentially segmented projecting portions respectively provided at peripheral-direction positions of a rear portion of said inclined cylinder.

5. The bellmouth with a joint as set forth in claim 4, further including a waterproofing ring disposed on the deep side of the portion thereof where said projecting portions are provided.

6. The bellmouth with a joint as set forth in claim 4, wherein each of said projecting portions includes, on at least one side thereof in the circumferential direction of said bellmouth, an inclined surface.

7. The bellmouth with a joint as set forth in claim 4, wherein at least one of said first and second openings of said bellmouth is temporally closed by a cover member.

8. The bellmouth with a joint as set forth in claim 6, wherein at least one of said first and second openings of said bellmouth is temporally closed by a cover member.

9. A concrete block body comprising:

a concrete block body member; and a bellmouth with a joint integrally provided with said concrete block body member, said bellmouth comprising, a bellmouth main body which includes:

a cylindrical-shaped portion having a first opening disposed at its other end so as to spread in a trumpet-like shape, and a second opening disposed at its other end and provided with an open guide cylinder capable of connecting a pipe thereto, a large-diameter cylinder portion formed in a deep portion of said second opening continuous with said open guide cylinder and having a diameter larger than front and rear walls extending in an axial direction of said cylindrical-shaped portion, and an outwardly facing projection disposed in a portion of said large-diameter cylinder portion, and a separately produced engaging ring having a non-annular or substantially C-like cross-sectional shape, said engaging ring including:

a guiding inclined surface having a large inside diameter on a width direction one end face side thereof and having a small inside diameter on a deep side thereof, a securing stepped portion formed on the deep side thereof, a plurality of notches respectively formed by cutting out said inclined surface, and a projection provided on and projected from a portion of the outer peripheral surface of said engaging ring, and wherein said engaging ring is inserted into an inside portion of said large-diameter cylinder portion of said bellmouth main body such that said large-diameter side end face of said guiding inclined surface is situated on an entrance side of said inside portion, and also such that said projection on the outer peripheral surface of said engaging ring is fitted with the inner surface recessed portion of said outwardly facing projection of said large-diameter cylinder portion, and wherein a plurality of said bellmouths are buried into said concrete block body member while an end face of said first opening of each bellmouths are substantially aligned in flush with a wall surface of said concrete block body member and also said plurality of said bellmouths are directed in the same direction, to thereby produce said concrete block body as an integral unit.

10. A concrete block body comprising:

a concrete block body member; and a bellmouth with a joint integrally provided with said concrete block body member, said bellmouth comprising:

a cylindrical-shaped portion having a first opening disposed at its one end so as to spread in a trumpet-like shape, and a second opening disposed at its other end;

an inclined cylinder larger in diameter on the deep side of thereof than an end face thereof;

a securing stepped portion formed on a rear surface of said inclined cylinder; and a plurality of projecting portions respectively provided at peripheral-direction positions of a rear portion of said inclined cylinder, wherein a plurality of said bellmouths are buried into said concrete block body member while an end face of said first opening of each bellmouths are substantially aligned in flush with a wall surface of said concrete block body member and also said plurality of said bellmouths are directed in the same direction, to thereby produce said concrete block body as an integral unit.

11. A hand hole comprising:

a hand hole member; and a bellmouth with a joint integrally provided with said hand hole member, said bellmouth comprising, a bellmouth main body which includes:

a cylindrical-shaped portion having a first opening disposed at its one end so as to spread in a trumpet-like shape, and a second opening disposed at its other end and provided with an open guide cylinder capable of connecting a pipe thereto, a large-diameter cylinder portion formed in a deep portion of said second opening continuous with said open guide cylinder and having a diameter larger than front and rear walls extending in an axial direction of said cylindrical-shaped portion, an outwardly facing projection disposed in a portion of said large-diameter cylinder portion, and a separately produced engaging ring having a non-annular or substantially C-like cross-sectional shape, said engaging ring including:

a guiding inclined surface having a large inside diameter on a width direction one end face side thereof and having a small inside diameter on a deep side thereof, a securing stepped portion formed on the deep side thereof, a plurality of notches respectively formed by cutting out said inclined surface, and a projection provided on and projected from a portion of the outer peripheral surface of said engaging ring, and wherein said engaging ring is inserted into an inside portion of said large-diameter cylinder portion of said bellmouth main body such that said large-diameter side end face of said guiding inclined surface is situated on an entrance side of said inside portion, and also such that said projection on the outer peripheral surface of said engaging ring is fitted with the inner surface recessed portion of said outwardly facing projection of said large-diameter cylinder portion, and wherein a plurality of said bellmouths are buried into said hand hole member while an end face of said first opening of each bellmouths are substantially aligned in flush with the inner peripheral surface of said hand hole member and also said plurality of said bellmouths are directed in the same direction, to thereby produce said hand hole as an integral unit.

12. The hand hole as set forth in claim 11, wherein at least two of said plurality of said bellmouths are buried in mutually opposing walls of said hand hole.

13. A hand hole comprising:

a hand hole member; and a bellmouth with a joint integrally provided with said hand hole member, said bellmouth comprising:

a cylindrical-shaped portion having a first opening disposed at its one end so as to spread in a trumpet-like shape, and a second opening disposed at its other end;

an inclined cylinder larger in diameter on the deep side of thereof than an end face thereof;

a securing stepped portion formed on a rear surface of said inclined cylinder; and a plurality of projecting portions respectively provided at peripheral-direction positions of a rear portion of said inclined cylinder, wherein a plurality of said bellmouths are buried into said hand hole member while an end face of said first opening of each bellmouths are substantially aligned in flush with the inner peripheral surface of said hand hole member and also said plurality of said bellmouths are directed in the same direction, to thereby produce said hand hole as an integral unit.

14. The hand hole as set forth in claim 13, wherein at least two of said plurality of said bellmouths are buried in mutually opposing walls of said hand hole.

15. The bellmouth with a joint as set forth in claim 2, wherein at least one of said first and second openings is temporally closed by a cover member.

16. The bellmouth with a joint as set forth in claim 5, wherein each of said projecting portions includes, on at least one side thereof in the circumferential direction of said bellmouth, an inclined surface.

17. The bellmouth with a joint as set forth in claim 5, wherein at least one of said first and second openings of said bellmouth is temporally closed by a cover member.

18. The concrete block body as set forth in claim 9, wherein at least one of said first and second openings of said bellmouth is temporally closed by a cover member.

* * * * *